(12) United States Patent
Stark et al.

(10) Patent No.: US 11,965,764 B2
(45) Date of Patent: Apr. 23, 2024

(54) METHOD FOR UNLOADING A PAYLOAD

(71) Applicant: DEERE & COMPANY, Moline, IL (US)

(72) Inventors: Sebastian Stark, Weinheim (DE); Frederic Ballaire, Neustadt (DE); Patrick Bechtold, Frankenthal (DE); Andreas Wehle, Nussloch (DE)

(73) Assignee: DEERE & COMPANY, Moline, IL (US)

( * ) Notice: Subject to any disclaimer, the term of this patent is extended or adjusted under 35 U.S.C. 154(b) by 640 days.

(21) Appl. No.: 16/580,728

(22) Filed: Sep. 24, 2019

(65) Prior Publication Data

US 2020/0096376 A1 Mar. 26, 2020

(30) Foreign Application Priority Data

Sep. 25, 2018 (DE) .......................... 102018216372.3

(51) Int. Cl.
| | | |
|---|---|---|
| *G01F 13/00* | (2006.01) | |
| *B65G 67/24* | (2006.01) | |
| *B65G 69/06* | (2006.01) | |
| *G01G 19/08* | (2006.01) | |
| *G01G 19/40* | (2006.01) | |

(52) U.S. Cl.
CPC ........... *G01F 13/001* (2013.01); *B65G 67/24* (2013.01); *B65G 69/06* (2013.01); *G01G 19/083* (2013.01); *G01G 19/40* (2013.01); *B65G 2814/0344* (2013.01)

(58) Field of Classification Search
CPC .... G01G 19/387; G01G 19/083; G01G 19/40; G01G 19/393; B65G 67/24; B65G 2814/0344; G01F 13/001
See application file for complete search history.

(56) References Cited

U.S. PATENT DOCUMENTS

| | | | |
|---|---|---|---|
| 3,677,427 A | 7/1972 | Allen | |
| 4,321,212 A | 3/1982 | Suzuki et al. | |
| 4,726,616 A * | 2/1988 | Schmidt | ............... B65F 1/122 |
| | | | 294/68.2 |
| 5,235,809 A * | 8/1993 | Farrell | ................... E02F 9/221 |
| | | | 60/494 |

(Continued)

FOREIGN PATENT DOCUMENTS

DE 102013203826 A1 9/2014

OTHER PUBLICATIONS

European Search Report issued in patent application No. 19197429.4, dated Feb. 12, 2020, 7 pages.

(Continued)

*Primary Examiner* — Randy W Gibson (57) ABSTRACT

A method for unloading a payload at a loading station includes selecting the payload to be unloaded from different payloads and registering a total target quantity of the selected payload to be unloaded at the loading station as a target quantity unit, a current total quantity of the selected payload that has already been unloaded at the loading station as an actual quantity unit, a number of already performed unloading procedures corresponding to a quantity of the selected payload that has already been unloaded at the loading station, or a difference between the target quantity unit and the actual quantity unit.

8 Claims, 4 Drawing Sheets

(56) References Cited

U.S. PATENT DOCUMENTS

| | | | | |
|---|---|---|---|---|
| 5,321,212 | A * | 6/1994 | Wadell | G01G 19/393 177/25.18 |
| 6,018,128 | A * | 1/2000 | Asai | G01G 19/393 177/4 |
| 6,157,889 | A * | 12/2000 | Baker | G01G 19/12 701/124 |
| 6,211,471 | B1 * | 4/2001 | Rocke | G01G 19/083 177/136 |
| 8,954,243 | B2 * | 2/2015 | Harshberger | G01G 19/10 701/1 |
| 10,900,824 | B2 | 1/2021 | Godsey | |
| 11,142,413 | B2 | 10/2021 | Hoofard et al. | |
| 11,174,618 | B2 | 11/2021 | Currier | |
| 11,208,125 | B2 | 12/2021 | Thiyagarajan et al. | |
| 11,319,695 | B2 | 5/2022 | Yamamoto | |
| 11,404,762 | B2 | 8/2022 | Ryden | |
| 2005/0145419 | A1 * | 7/2005 | Deters | G01G 13/18 222/77 |
| 2008/0017645 | A1 * | 1/2008 | Garagiola | B65F 1/122 220/345.4 |
| 2009/0126473 | A1 * | 5/2009 | Porat | G01F 23/00 340/815.4 |
| 2011/0166696 | A1 * | 7/2011 | Nignon | B07C 5/38 700/223 |
| 2014/0291038 | A1 * | 10/2014 | Hague | E02F 3/431 177/1 |
| 2014/0336874 | A1 | 11/2014 | Harshberger, II et al. | |
| 2016/0047689 | A1 | 2/2016 | Stanley et al. | |
| 2017/0113591 | A1 | 4/2017 | Spielman, Jr. et al. | |
| 2018/0364091 | A1 | 12/2018 | Godsey | |

OTHER PUBLICATIONS

European Search Report issued in patent application No. 19197267.8, dated Feb. 24, 2020, 7 pages.

Frederic Ballaire, Dynamic, Continuous, and Center of Gravity Independent Weighing with a Loader, Technical University of Kaiserslautern, Oct. 17, 2014, 188 pages.

Altair EDEM, Discrete Element Modeling (DEM) Software, <URL: https://www.altair.com/edem/>, accessed Mar. 29, 2023, 16 pages.

Mathworks, Choose a Solver, <URL: https://www.mathworks.com/help/simulink/ug/choose-a-solver.html>, 3 pages.

Mathworks, Simscape Multibody Link, <URL: https://www.mathworks.com/help/smlink/index.html>, 2 pages.

Heinrich Hertz, Über die Berührung fester elastischer Körper, Journal für die reine und angewandte Mathematik, Berlin, 1881, pp. 156-171.

Matthias Fritz, Andreas Wolfschluckner, and Dirk Jodin, Simulation von Paketen im Pulk, Logistics Journal - ISSN 1860-5923, Graz, 2013, pp. 1-8.

P. A. Cundall and O. D. L. Strack, A discrete numerical model for granular assemblies, Géotechnique 29, No. 1, 47-65, 1979, pp. 47-65.

Wolfgang Eisenberg and Uwe Renner, Zur Beschreibung grobgranularer Schüttgüter mit zellulären Automaten, Arnold-Sommerfeld-Gesellschaft e.V., Leipzig, 2004, pp. 247-252.

Jürgen Roßmann, Michael Schluse, Thomas Josef Jung, and Malte Rast, Interaktive integrierte Starrkörperdynamik- und Schüttgutsimulation, Institut für Mensch-Maschine- Interaktion, RWTH Aachen, Aachen, 2009, pp. 31-48.

K. L. Johnson, K. Kendall, and A. D. Roberts, Surface Energy and the Contact of Elastic Solids, Proceedings of the Royal Society of London, Series A, Mathematical and Physical Sciences, Berlin, 1971, pp. 301-313.

Dawei Zhao, Erfan G. Nezami, Youssef M.A. Hashash, and Jamshid Ghaboussi, Three- dimensional discrete element simulation for granular materials, Engineering Computations 23(7): 749-770, Illinois, USA, 2006, pp. 749-770.

Matthias Börner, Einführung in die Diskrete Elemente Methode, NaWiTec, Institut für Verfahrenstechnik, Otto-von-Guericke Universität Magdeburg, Magdeburg, 2011, 75 pages.

D. Schulze, Pulver und Schüttgüter, Springer Verlag, ISBN: 978-3-540-88448-4, 2009, 30 pages.

Heinrich Hertz, Über die Berührung fester elastischer Körper, Journal für die reine und angewandte Mathematik, Berlin, 1881, 32 pages.

Alexander Schinner, Ein Simulationssystem für granulare Aufschüttungen aus Teilchen variabler Form, Otto-von-Guericke-Universität Magdeburg, 2000, 359 pages.

Matthias Fritz, Andreas Wolfschluckner, and Dirk Jodin, Simulation von Paketen im Pulk, Logistics Journal - ISSN 1860-5923, Graz, 2013, 16 pages.

Wolfgang Eisenberg and Uwe Renner, Zur Beschreibung grobgranularer Schüttgüter mit zellulären Automaten, Arnold-Sommerfeld-Gesellschaft e.V., Leipzig, 2004, 12 pages.

Jürgen Roßmann, Michael Schluse, Thomas Josef Jung, and Malte Rast, Interaktive integrierte Starrkörperdynamik- und Schüttgutsimulation, Institut für Mensch-Maschine- Interaktion, RWTH Aachen, Aachen, 2009, 36 pages.

D. Schulze, Pulver und Schüttgüter, Springer Verlag, ISBN: 978-3-540-88448-4, 2009, 1051 pages.

* cited by examiner

METHOD FOR UNLOADING A PAYLOAD

RELATED APPLICATIONS

This application claims priority to German Patent Application Ser. No. 102018216372.3, filed Sep. 25, 2018, the disclosure of which is hereby incorporated by reference in its entirety.

FIELD OF THE DISCLOSURE

The present disclosure relates to a method for unloading a payload at a loading station.

BACKGROUND

A work machine with a lifting device for lifting and lowering a payload is known from DE 10 2013 203 826 A1. The mass of the payload can be continuously determined using a weighing device by a sensor system. The lifting device comprises a picking unit in the form of a loader bucket for transporting and unloading the payload.

There is a need to make the unloading of a payload at a loading station more comfortable for a user.

SUMMARY

In the present disclosure, a selection step is carried out in the method for unloading a payload at a loading station (e.g., a trailer, a loading area on a field or at a silo). The payload to be unloaded is selected from various possible payloads. The selected payload will be registered as a piece of information. By registering, more information can be associated with the selected payload. For this purpose, at least one of the following items of information is registered:
- a target total gas quantity $m\_sum\_ziel$ of the selected payload to be unloaded at the loading station as a target quantity unit,
- a current total quantity $m\_sum\_akt$ of the selected payload that has already been unloaded at the loading station (26) as an actual quantity unit,
- a number $n\_KV$ of already performed unloading procedures, which corresponds to an already unloaded quantity $m\_sum\_akt$ of the selected payload (L) at the loading station (26),
- a difference $\Delta m\_sum$ between the target quantity unit and the actual quantity unit.

The respective information is registered and processed in a memory unit or a control unit. Owing to the registration, the conditions are created for a user of the method, e.g., the driver of a work machine for transporting and unloading payloads, to be supported in loading work by appropriate assistance functions. For example, the user can be continuously informed about the status of the loading work using any one or all of the aforementioned and, if necessary, other items of information in order to interrupt, to continue or to terminate the current loading work without any loss of information. Automatic control of individual transport or loading movements of the work machine depending on individual items of information is also possible. This significantly reduces the load on the user during loading work.

The payload is selected in particular before a first loading procedure of the current loading work and the current loading work is then carried out in full. In other embodiments, the current loading work is interrupted—among other things by loading work with other selected payloads—and is continued at a later point in time. Here, the user can first select the associated payload again when the interrupted loading work continues, so that he can also be informed again about the information assigned to and registered for this payload. This provides the user with efficient support in the precise processing of each piece of loading work, even in the event of interruptions to individual loading work.

As mentioned above, in the case of upcoming loading work, a payload can be selected from different possible payloads and registered in the time before a first unloading procedure. Between this selection and registration on the one hand and the first unloading procedure, at least one further method step is carried out. For example, the selected payload is picked by a work machine and transported to the loading station to unload the picked payload there. In addition, individual information can be registered before the unloading procedure and the selected payload can be assigned to or signalled to the user. In particular, the steps of picking, transporting and unloading of the selected payload can be repeated in the context of the same loading work, resulting in the total number of unloading procedures in this loading work. This total number of unloading procedures depends in particular on the total target quantity $m\_sum\_ziel$ of the selected payload to be unloaded at the loading station.

A user can be offered multiple different payloads to choose from, for example, on a display or screen. The payload to be transported and unloaded, for example, will be selected before the start of the current loading work by entering a corresponding signal at an input unit.

The different payloads can be represented and offered by any different specific feature $spez\_L$, e.g., by specifying the nature, the type or the material of the respective payload. The payloads that can be selected can be materials with different physical characteristics or properties. They can have different aggregate states. For example, the payload may include a liquid, seeds, animal feed, bales (e.g., straw or hay or different bale sizes), soil, sand or stone mixtures such as ballast, gravel and similar.

The total target quantity $m\_sum\_ziel$ of the selected payload for the current loading work can be registered as one or more target quantity unit(s). Likewise, the already unloaded, current total quantity $m\_sum\_akt$ of the selected payload of the current loading work can be registered as one or more actual quantity unit(s). Depending on different specific characteristics $spez\_L$ of the payloads, different target and actual quantity units can make sense. For example, in the case of bales as a payload, these can be registered as a quantity unit in the form of a natural number. Alternatively or additionally, this payload can be registered as a quantity unit in the form of a weight or mass unit (e.g., in kg). In loading work with a specific packaging as a payload, such as a bale, then the number of bales already unloaded will be registered as a natural number and in addition, the determined mass of these already unloaded bales will be registered.

The registered information is signalled to the user by a display unit in order to further relieve the load on him during the loading work. The signalling is done by a suitable electronic unit, e.g., a screen, a display for reading or entering data. Individual registered information can be specified by a control unit or by the user. This applies for example to the total target quantity $m\_sum\_ziel$ of the payload to be unloaded at the loading station (i.e., by several consecutive unloading procedures).

The payload is unloaded using a picking unit, which is disposed on a lifting device of a work machine. The work machine is designed in particular as a commercial vehicle. Tractors, towing vehicles, construction equipment, wheel loaders, excavators, shovel excavators, telehandlers and tipping drones are suitable as commercial vehicles.

Depending on the type or functionality of the respective work machine, the lifting device can comprise a single rigid cantilever part or alternatively a plurality of movably interconnected cantilever parts between the work machine and the picking unit.

Depending on its specific feature spez_L, the payload is disposed either in or on the picking unit. The picking unit is designed accordingly for this. The picking unit can be any container for picking a payload. The picking unit is used to pick, transport and unload the selected payload. The picking unit is fixedly or movably attached to the lifting device in a suitable manner. For example, the picking unit is arranged as a shovel on the lifting device in an articulated manner. In another case, the picking unit is embodied as a loading fork (e.g., for transporting and unloading bales) or the picking unit is fixedly disposed on a loading fork. Further embodiments of the picking unit are, for example, embodied in jaw-like form, especially as clamping jaws.

In one embodiment, the payload is emptied out of the picking unit, for example tipped out, poured out or drained, and thus unloaded. In particular, the picking unit is a container for any bulk material, such as a liquid, seed, animal feed, soil, sand or a stone mixture such as ballast, gravel and similar. Bales can also be transported with and tipped out of the picking unit with the appropriate embodiment and sizing of the picking unit.

To achieve the total target quantity $m\_sum\_ziel$, the method can include multiple unloading procedures in succession or a single unloading procedure.

In particular, the method supports loading work in which the payload is emptied from the picking unit proportionately in the event of at least one loading procedure. For example, several unloading procedures occur one after the other, each with full unloading of the payload from the picking unit, while the last unloading procedure requires only a partial discharge of the payload in order to achieve the predetermined total target quantity $m\_sum\_ziel$ at the loading station as accurately as possible. In the same way, the method is advantageous in loading work that requires a single unloading procedure with only proportionate discharging of the payload from the picking unit in order to achieve the predetermined total target quantity $m\_sum\_ziel$ at the loading station as accurately as possible.

In order to support a pro rata or partial discharge of the payload from the picking unit with high accuracy, an unloading procedure—in particular, the last unloading procedure of a current loading work or loading activity—is terminated depending on the detection of at least one of the following variables:

a predetermined residual mass $m\_re$ of the payload still in the picking unit, a payload mass $m\_zul$ unloaded and predetermined during the current unloading procedure.

By suitable technical means (e.g., a suitable weighing device on the work machine) it is mathematically and technically easy to detect whether and when the predetermined residual mass $m\_re$ is reached or the predetermined payload mass $m\_zul$ is reached, i.e., unloaded. In this way the method provides an automatic bulk function that achieves a predetermined total target quantity $m\_sum\_ziel$ at a work station or loading station automatically and with high accuracy. The method thus provides a beneficial assistance function during loading work of the work machine and significantly relieves the load on the user during the loading work.

The direct or indirect detection of the predetermined residual mass $m\_re$ also involves the possibility that this mass $m\_re$ is detected with a certain inaccuracy compared to the actual mass of the payload still disposed in the picking unit. This inaccuracy corresponds to a tolerance range that takes into account different factors, such as properties of the sensors of a weighing device for determining a mass of the payload, the size of the payload mass $m\_zul$ to be unloaded and properties of the payload. The same applies to a direct or indirect detection of the predetermined unloaded payload mass $m\_zul$ in relation to an actually unloaded mass.

During the method, a mass of the payload located in or on the picking unit is determined. This determination of a mass of the payload can be done once or multiple times, especially continuously. The measured mass is registered in particular as an information item and is then also signalled by the aforementioned display unit.

In particular, immediately before the potential or current unloading procedure or during the potential or current unloading procedure, a mass of the payload located in or on the picking unit is determined. Further mass values can be derived from this. For example, the quantity of the selected payload already unloaded at the loading station during previous unloading procedures may be determined and registered as the already mentioned current total quantity $m\_sum\_akt$ of the payload.

The mass of the payload in or on the picking unit is determined in particular by a suitable weighing device on the work machine. For example, the method known from DE 10 2013 203 826 A1 for weighing a payload can be used.

The mass of the payload in or on the picking unit immediately before the start of the unloading procedure under consideration can be described as a starting mass $m\_st$. It corresponds to a current mass $m\_akt$ of the payload in or on the picking unit immediately before the start of the unloading procedure. During the unloading procedure, the current mass $m\_akt$ of the payload in or on the picking unit can be determined once or multiple times, e.g., continuously or at certain intervals. The operator of the work machine, a user or an electronic control system of the work machine can be regularly informed about the current mass $m\_akt$.

The determination of the starting mass $m\_st$ or the current mass $m\_akt$ makes it possible to mathematically and technically easily detect whether and when the predetermined residual mass $m\_re$ or the predetermined payload mass $m\_zul$ is achieved.

The determined starting mass $m\_st$ can be compared with the predetermined payload mass $m\_zul$. This comparison provides a simple control measure for determining whether the payload disposed in or on the picking unit immediately before an unloading procedure should be unloaded in full or only on a pro rata basis. If $m\_st \leq m\_zul$ is detected, the payload can be fully unloaded and the unloading procedure is finished. In this case, detection of the remaining mass $m\_re$ or the unloaded payload mass $m\_zul$ is not absolutely mandatory in order to initiate an end to the unloading procedure.

The residual mass $m\_re$ can be predetermined easily in procedural terms if the starting mass $m\_st$ of the payload in the picking unit is already known before the unloading procedure. This starting mass $m\_st$ corresponds to the current mass $m\_akt$ of the payload immediately before or at the start of the unloading procedure and can therefore be technically simply determined using the same technical means (e.g., a weighing device) with which the current mass $m\_akt$ is determined during the unloading procedure.

Furthermore, the remaining mass m_re is predetermined depending on the predetermined payload mass m_zul. For example, the remaining mass m_re can be relatively accurately predetermined by the equation $$m\_re = m\_st - m\_zul.$$

In another embodiment, the current mass m_akt of the payload in the picking unit is compared with the predetermined residual mass m_re before the unloading procedure is terminated. This comparison or the comparison result provides a technically simple criterion for initiating termination of the unloading procedure at the optimal time during the unloading procedure. In order to support the accuracy of the procedure, the current mass m_akt is determined at defined or constant time intervals and then compared with the predetermined residual mass m_re.

In a further embodiment, the lifting device comprises a cantilever, which is pivotably supported relative to the work machine about a first swivel axis. The picking unit is pivotably supported relative to the cantilever about a second swivel axis. In this case, the current mass m_akt can be determined during the unloading procedure or at the start of the unloading procedure (starting mass m_st) with technically simple means, for example, by using sensor devices that are available as standard and appropriate algorithms. The detection or calculation of the mass is carried out in particular depending on at least one of the following variables: a mass of the cantilever, a mass of the picking unit, a torque about the first swivel axis, a torque about the second swivel axis, a center of gravity of the mass of the cantilever in relation to the first swivel axis and a center of gravity of the mass of the picking unit in relation to the second swivel axis. The aforementioned torques, in turn, are determined by taking into account actuator forces (in particular, cylinder forces) on the cantilever. These forces can be determined, for example, by pressure sensors.

During the unloading procedure a tilt angle w_k of the picking unit is changed in a tilting direction relative to a straight reference line (e.g., a vertical or horizontal to the work machine or the earth). This allows the accuracy of the partial tipping of the payload from the picking unit to be further improved by a controlled, varying tilt angle w_k.

In order to support an efficient unloading procedure with high accuracy, the determination of the current mass m_akt or the variation of the tilt angle w_k is carried out before the expiry of set time intervals. By changing the time interval accordingly, the accuracy of the unloading procedure can be adapted to the requirements of the respective loading activity. The continuous determination and adjustment of current values allows for high accuracy of the unloading procedure even for payloads with complex properties (e.g., sticky bulk goods, bulk material with several mixed materials).

In another embodiment, the achievement of the predetermined residual mass m_re or the predetermined payload mass m_zul is indirectly detected depending on a target value w_soll. During the unloading procedure, the picking unit only needs to be adjusted to the value w_k=w_soll with respect to the tilt angle w_k thereof. This reduces the duration of the unloading procedure itself and supports a time-efficient procedure.

In order to keep the procedure technically simple and easy to use when using a target value w_soll of the tilt angle w_k, the target value w_soll is derived and set based on the provided calibration data.

In order to be able to use the calibration data in a particularly simple way from a procedural point of view, the data represent a relationship between a mass of the payload and a tilt angle of the picking unit relative to a straight reference line. In particular, the current mass m_akt of the payload in the picking unit is recorded at different tilt angles w_k and stored as calibration data. During working operations, this allows a simple conversion from a desired residual mass m_re or payload mass m_zul to a target value of the tilt angle w_k.

The calibration data can be stored as a calibration diagram (e.g., a table or a curve). Specific calibration data are produced for specific materials as payloads or bulk material. Apart from the specific type of the payload, the calibration data can also take into account other features, such as particle geometries, temperature, humidity of the payload and a holding time for the tilt angle w_k=w_soll.

The calibration can be carried out at a time regardless of the imminent loading activity and the calibration data can then be retrieved if required, e.g., from a corresponding material database. Alternatively, calibration data can be produced and stored in a calibration operation immediately before the planned loading activity with the payload to be tipped out. This allows characteristic features of the payload to be taken into account in the calibration data in an up-to-date and accurate manner.

The calibration involves recording a plurality of pairs of values. Interim values can optionally be generated by interpolation. In this way, the current mass m_akt of the payload in the picking unit can be represented as a function of the tilt angle w_k of the picking unit.

During the unloading procedure, at least one shaking operation is performed. This ensures that the payload can reliably detach from the picking unit even in the case of adhesive properties. This in turn supports the achievement of the predetermined residual mass m_re in the picking unit with high accuracy and a short procedure duration. With each shaking operation, the picking unit is tilted at least once opposite to the tilting direction and then in the tilting direction. The tilt angles w_k used in this case can be specified for the respective shaking procedure or can be adjusted individually.

The picking unit is tilted opposite to the tilting direction in order to terminate the unloading procedure or during the termination of the unloading procedure. This ensures that no further part of the payload is actually tipped out in the case of a detected residual mass m_re in the picking unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
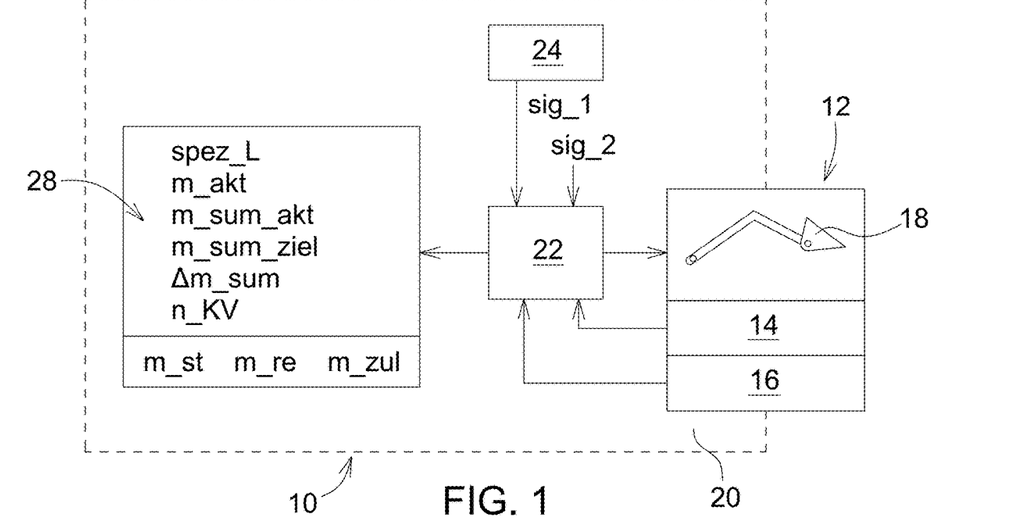
FIG. 1 shows a schematic block diagram type representation of a work machine with a control unit for carrying out the method.

FIG. 1 shows schematically individual components of a work machine 10 in the form of a tractor or a towing machine with a lifting device 12 disposed thereon in the form of a front loader. The work machine 10 comprises a suitable sensor system 14 and a weighing device 16. The weighing device 16 can weigh a selected payload L(spez_L) that is located in a picking unit 18 embodied as a shovel. In another embodiment, the picking unit 18 is, for example, embodied as a loading fork (especially for bales).

The sensor system 14 includes, for example, various accelerometers, pressure sensors or strain gauges, which can be disposed on the lifting device 12 or on a supporting structure 20 of the work machine 10. The sensor system 14 can be embodied as the type of sensor device according to DE 10 2013 203 826 A1. In one embodiment, the weighing device 16 can also be embodied and functionally effective as the type of weighing device according to DE 10 2013 203 826 A1.

Signals or data from the sensor system 14 and the weighing device 16 are sent to an electronic control unit 22 of the work machine 10. In a further embodiment that is not represented here, the weighing device 16 is part of the control unit 22. The control unit 22 controls the lifting device 12 or the picking unit 18 thereof in order to enable unloading of the selected payload L(spez_L) from the picking unit 18 in a way that is yet to be described.

In the case of a shovel as the picking unit 18, unloading the payload L(spez_L) usually means tipping the payload L(spez_L) out. Accordingly, the unloading procedure can then also be referred to as a tipping procedure.

An input unit 24 is connected to the control unit 22. The input unit 24 is, for example, embodied as a keyboard or a display and is used for entering data (e.g., manually, by voice) by a user, e.g., a user or operator of the work machine 10. The input unit 24 sends the entered data to the control unit 22 as signals sig_1. Furthermore, the control unit 22 can receive signals sig_2. The signals sig_2 represent data from an information system (e.g., CAN bus, CANFD bus, Ethernet, EtherCAT, LIN bus, FlexRay bus, IIC, UART) of the work machine 10 and, if necessary, other data that are available regardless of the individual data input of the user or the operator of the work machine 10.

For example, the user chooses a payload L(spez_L) from at least two different possible payloads L(i), i.e., i≥2. The selection will be made depending on the planned loading work. The index spez_L represents any specific feature by which the selected payload L(spez_L) differs from other selectable payloads L(i). The selection of the respective payload L(spez_L) is communicated by the signal sig_1 to the control unit 22 and is registered there.

For example, the control unit 22 receives information by the signals sig_1 about the type of selected payload L(spez_L), e.g., a specific type of bale (hay, straw, etc.) or bale size, soil, gravel, specific liquid, etc.

Furthermore, the user can use the signals sig_1 to the control unit 22 to communicate a total target quantity m_sum_ziel of the payload L(spez_L) that is to be unloaded at a loading station 26. The total target quantity m_sum_ziel may also depend on a maximum allowable load, which is communicated to the control unit 22 by the signals sig_1 or sig_2.

Furthermore, the control unit 22 provides registered information or data to a display unit 28. The display unit 28 allows the user or operator of the work machine 10 to be informed about the progress of the loading activity at the loading station 26. In principle, the display unit 28 can be used to signal all the information that is registered in the control unit 22 or in a memory unit. For example, the display unit 28 signals the following registered information:

- the selected payload L(spez_L) or a specific feature spez_L differentiating between different payloads L(i),
- a current mass m_akt of the payload L(spez_L) that is currently in the picking unit 18,
- a current total quantity m_sum_akt of the payload L spez_L) already unloaded at the loading station 26,
- the total target quantity m_sum_ziel of the selected payload L(spez_L) to be unloaded at the loading station 26,
- a difference Δm_sum between the total target quantity m_sum_ziel and the current total quantity m_sum_akt, and
- a number n_KV of already performed loading operations in the current loading work, wherein this number n_KV is the current total quantity m_sum_akt of the selected payload L(spez_L) already unloaded at the loading station 26.

Figure 2:
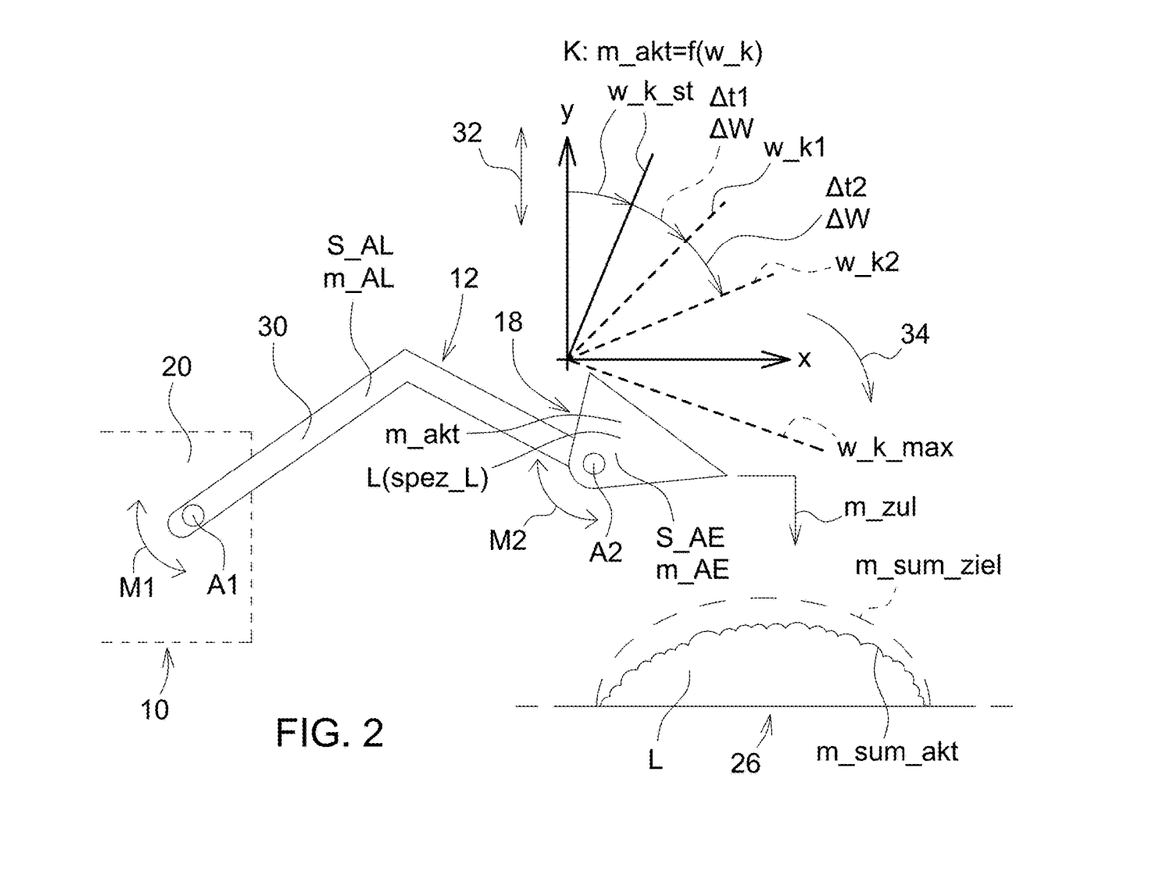
FIG. 2 shows a schematic representation of the lifting device.

The current total quantity of the selected payload L(spez_L) already unloaded at the loading station 26 is indicated schematically as a current total mass m_sum_akt with a solid line in FIG. 2. The associated total target quantity is indicated as a total target mass m_sum_ziel with a dotted line.

If the current loading work at the loading station 26 for the selected payload L(spez_L) requires multiple successive unloading procedures, the difference Δm_sum in the last unloading procedure corresponds to a payload mass m_zul that is predetermined by this difference. This predetermined payload quantity m_zul of the payload L(spez_L) should be tipped out in the last unloading procedure or tipping procedure as accurately as possible to avoid exceeding the target total mass m_sum_ziel at the loading station 26. The same applies if only a single tipping operation is needed. Then this single tilting operation is also the last tipping procedure at the same time.

In one embodiment of the display unit 28, the mentioned payload mass m_zul, a yet to be described starting mass m_st in the picking unit 18 and a residual mass m_r in the picking unit 18, which is also still to be described, can also be signalled.

FIG. 2 shows schematically the lifting device 12 disposed on the work machine 10. The lifting device 12 comprises a cantilever 30 that is pivotably supported about a first swivel axis A1 relative to the work machine 10. The picking unit 18 is pivotably supported about a second swivel axis A2 relative to the cantilever 30.

Various physical features of the cantilever 30 and the picking unit 18 can be used to determine a mass of the payload L(spez_L) in the picking unit 18. The starting mass m_st or the current mass m_akt can be determined, for example, by the sensor system 14 and provided algorithms (e.g., based on DE 10 2013 203 826 A1) depending on the following variables including a mass m_AL of the cantilever 30 and its center of gravity S_AL relative to the first swivel axis A1, a mass m_AE of the picking unit 18 and its center of gravity S_AE relative to the second swivel axis A2, a torque M1 about the first swivel axis A1 and a torque M2 about the second swivel axis A2.

The movable swivel support of the picking unit 18 about the swivel axis A2 allows different tilt angles w_k of the picking unit 18 relative to a vertical 32, which forms a straight reference line for a varying tilt angle w_k. The straight reference line corresponds to the y-axis of the indicated x/y coordinate system. Other straight reference lines are conceivable, e.g., a horizontal that would correspond to the x-axis of the aforementioned coordinate system.

During a tipping procedure, the tilt angle w_k is varied in a tilting direction 34 and thus becomes gradually larger. The tilt angle w_k is gradually reset after the expiry of a defined time interval, as represented by way of example using the time intervals Δt1 and Δt2, the angle changes Δw and the changed tilt angles w_k1 and w_k2 in the x/y coordinate system. At the beginning of the tipping procedure, the tilt angle w_k is adjusted and defined as a starting angle w_k_st relative to the straight reference line used (i.e., the vertical y-axis). This adjustment can be done automatically by the control unit 22 by registered data. Starting from the starting angle w_k_st, a maximum angle change is defined to trigger automated termination of the tipping procedure. At the selected straight reference line in FIG. 2 it is a maximum tilt angle w_k_max, the detection of reaching or falling below which triggers termination of the tipping procedure. At the maximum tilt angle w_k_max, the picking unit 18 is opened wide down towards the loading station 26. Nevertheless, the maximum tilt angle w_k_max is set in particular in such a way that there is still room for movement between it and the mechanical end stop of the picking unit 18.

In another embodiment of the method, the control unit 22 accesses stored calibration data representing a ratio between a mass of the payload L(spez_L) in the picking unit 18 and a corresponding tilt angle w_k of the picking unit 18. In particular, the stored calibration data are the current mass m_akt of a specific payload L(spez_L) in the picking unit 18 as a function of the tilt angle w_k, thus m_akt=f(w_k). The calibration data are provided as a characteristic curve K or a table. Different characteristic curves K or tables are usually provided for different payloads L(i) with different specific characteristics spez_L.

The calibration data can be stored in the control unit 22 of the work machine 10 or can be communicated to the control unit 22 by the signal sig_2, for example.

The control unit 22 is designed in such a way that it receives and sends all the data, signals, etc. that are required to carry out a tilting procedure. In particular, the control unit 22 controls the lifting device 12 and the picking unit 18 thereof. For this purpose, hydraulic cylinders on the lifting device 12 are operated.

Figure 3:
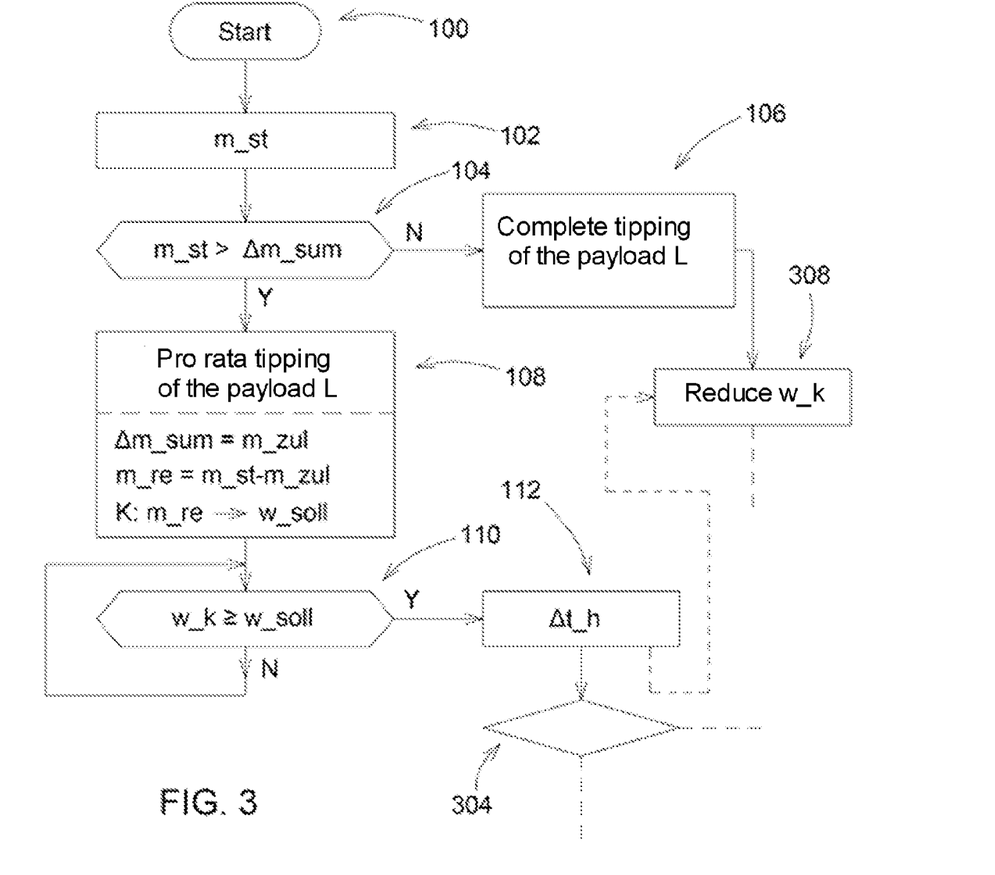
FIG. 3 shows a flow diagram of the method according to the present disclosure in a first embodiment.

FIG. 3 shows significant steps of the method in a first embodiment. At the beginning of loading work, different possible payloads L(i) are offered to the user, e.g., in a selection menu of a display (step 88). The user selects the payload L(spez_L) provided for the current loading work (step 90).

After step 90, one or more procedure steps that are not specified here can be carried out (e.g., picking and transporting the selected payload L(spez_L), registering information, at least one tipping procedure already performed during this loading work) before a starting step 100 is carried out.

After the starting step 100, the current mass m_akt of the payload L(spez_L) in the picking unit 18 is determined in step 102. This mass of the payload L(spez_L) corresponds to the starting mass m_st thereof immediately before the start of a tilting operation. Step 104 compares the starting mass m_st with the difference Δm_sum between the target total mass m_sum_ziel and the current total mass m_sum_akt. If the starting mass m_st is no larger than the difference Δm_sum, the payload L(spez_L) can be completely tipped out of the picking unit 18 (step 106) during the current unloading procedure. After that, further procedural steps, e.g., in particular a step 308 and a step 306 according to FIG. 5, can be taken to change the tilt angle w_k towards the starting angle w_k_st and to end the tipping procedure.

If the starting mass m_st is larger than the difference Δm_sum, the payload L(spez_L) should only be tipped out proportionately, namely as precisely as possible as the quantity of the mass corresponding to this difference Δm_sum. Thus, the payload mass m_zul to be tipped out during this tipping procedure is predetermined to be the difference Δ_sum (step 108). This tipping procedure is the last tipping procedure of a loading activity in which, in contrast to the previous tipping procedures with full tipping, only a pro rata tipping of the payload L(spez_L) from the picking unit 18 is to be made in order to achieve the total target mass m_sum_ziel at the loading station 26 as accurately as possible.

Also, in step 108, the residual mass m_re remaining in the picking unit 18 is predetermined by the equation m_re=m_st−m_zul. From the stored calibration data or the characteristic curve K, the target value w_soll of the tilt angle w_k can be predetermined, which corresponds to the remaining mass m_re in the picking unit 18 (step 108).

By the control unit 22, the tilt angle w_k of the picking unit 18 is adjusted until the predetermined target value w_soll is reached or exceeded (step 110). If reaching or exceeding the target value w_soll is determined or detected, this corresponds to the indirect detection of the predetermined residual mass m_re.

After the expiry of a defined holding time Δt_h for the set target value w_soll (step 112), in a variant of the method the tilt angle w_k can be returned towards the starting angle w_k_st to complete the tipping procedure. This variant is indicated after step 112 as a dashed arrow in the direction of step 308.

Figure 5:
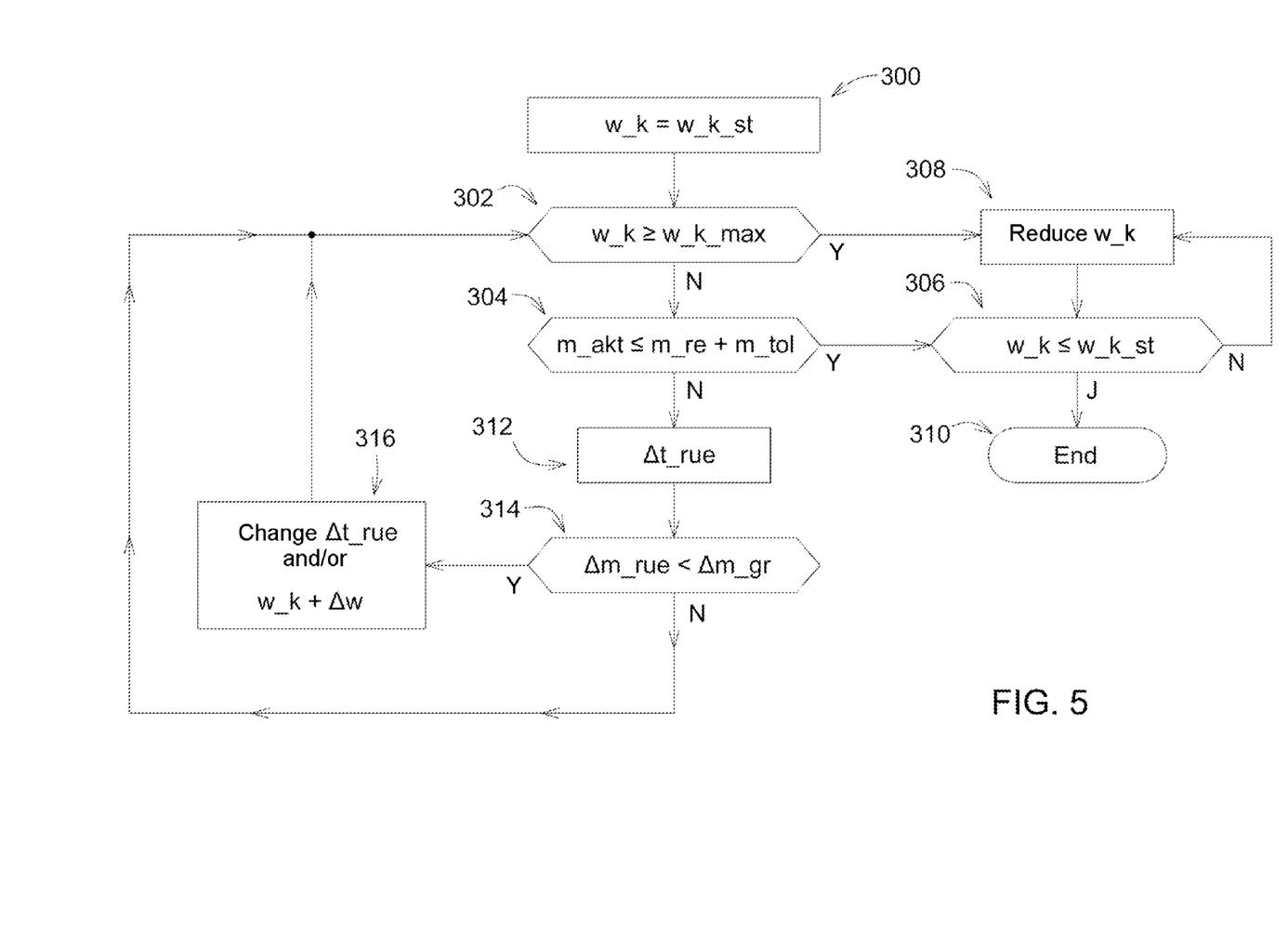
FIG. 5 shows a flow diagram with further method steps for use in the methods according to FIG. 3 and FIG. 4.

In the case of an alternative variant of the method, after the holding time Δt_h has expired a check is carried out in a step 304 in accordance with FIG. 5 as to whether the predetermined residual mass m_re in the picking unit 18 has been reached or fallen below with a tolerance taken into account in the form of a tolerance mass m_tol (e.g., 20 kg). If so, the tilt angle w_k is returned towards the starting angle w_k_st and the tipping procedure is terminated (steps 306, 308, 310).

If in step 304 the predetermined residual mass m_re in the picking unit 18 has not yet been reached, including taking the tolerance into account, a shaking operation will be carried out in a step 312 during a defined shaking time Δt_rue. During this, the picking unit 18 is moved—once or several times depending on the shaking time Δt_rue—oppositely to the tilting direction 34 and in the tilting direction 34 in order to tip out a further mass of the payload L from the picking unit 18. In a following step 314, the shaking mass Δm_rue that was tipped out by the shaking procedure is compared with a defined mass limit value of Δm_gr.

If step 314 shows that the shaking mass Δm_rue has reached or exceeded the mass limit Δm_gr, it can be checked again when passing through steps 302 and 304 whether even more mass of the payload L should be tipped out of the picking unit 18 or whether the tilting procedure can be terminated (steps 306, 308, 310). If in step 314 the shaking mass Δm_rue is less than the mass limit value Δm_gr, further measures are initiated in step 316, namely the shaking time Δt_rue is changed or the tilt angle w_k is increased. Which measure is carried out with which physical parameters can be affected by the determined difference between the two values shaking mass Δm_rue and mass limit value Δm_gr. After that, if the maximum tilt angle w_k_max is not yet reached, steps 302 and 304 will be repeated. This checks again whether further payload L mass should be tipped out of the picking unit 18 or whether the tilting procedure can be terminated (steps 306, 308, 310).

Especially with a payload L(spez_L) with complex properties (e.g., sticky, too-fluid) with tilting behavior that is not exactly reproducible, it can be advantageous to increase the accuracy of the tipping procedure to not detect reaching the predetermined residual mass m_re or the completed tipping of the predetermined payload mass m_zul indirectly, as described on the basis of steps 108, 110 according to FIG. 3. Rather, alternatively to the procedure in accordance with FIG. 3, calibration data or characteristic curves K can be dispensed with. Reaching the predetermined residual mass m_re or the complete tipping of the predetermined payload mass m_zul during a tipping procedure is detected directly by determining the current mass m_akt of the payload L(spez_L) in the picking unit 18 during this tipping procedure. The current mass m_akt is determined several times during the tipping procedure, especially continuously after the expiry of certain time intervals. For example, the time intervals Δt1 and Δt2 can be used for the gradual adjustment of the tilt angle w_k.

Figure 4:
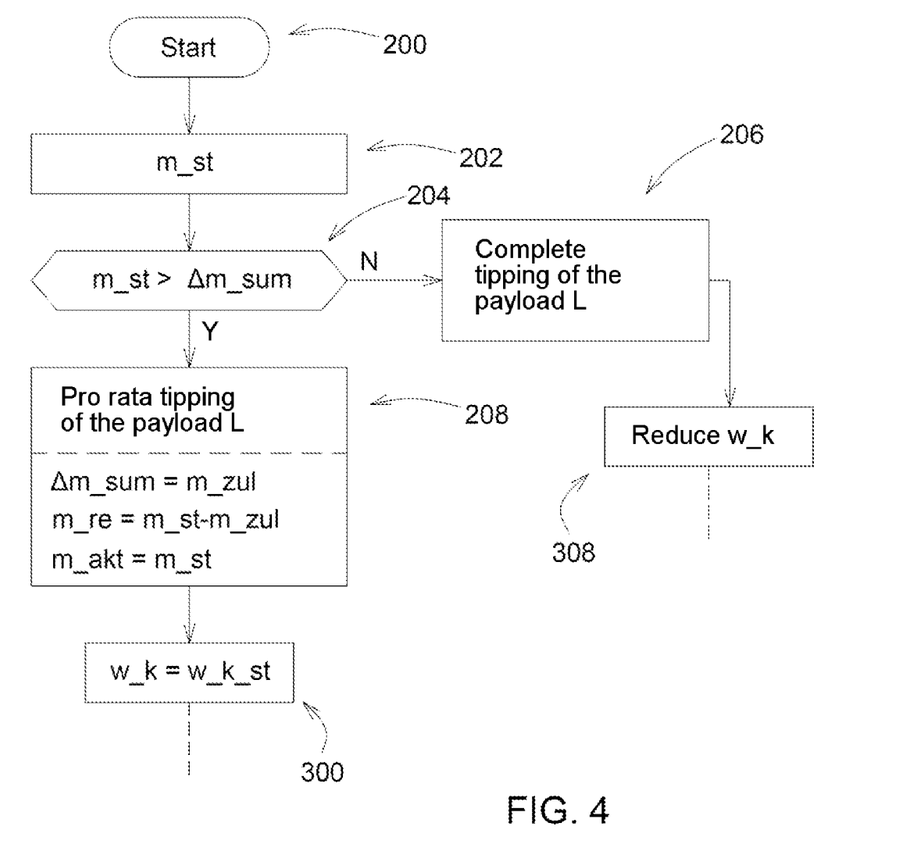
FIG. 4 shows a flow diagram of the method according to the present disclosure in a further embodiment.

FIG. 4 shows significant steps of the procedure in a further embodiment. In this case, in FIG. 4 the sequence of a tipping procedure is shown in which reaching the predetermined residual mass m_re is detected directly, i.e., without calibration data or characteristic curves K. At the beginning of loading work, the user is (similarly to in FIG. 3) offered different possible payloads L(i), e.g., in a selection menu of a display (step 188). The user selects the payload L(spez_L) provided for the current loading work (step 190).

After step 190, one or more procedure steps that are not specified here can be carried out (e.g., picking and transporting the selected payload L(spez_L), registering information, at least one already performed tilting procedure during this loading work) before a starting step 200 is carried out.

After the starting step 200, the current mass m_akt of the payload L(spez_L) in the picking unit 18 is determined in step 202. This mass of the payload L(spez_L) corresponds to the starting mass m_st thereof immediately before the start of the tilting procedure. Step 204 compares the starting mass m_st with the difference Δm_sum between the target total mass m_sum_ziel and the current total mass m_sum_akt. If the starting mass m_st is no larger than the difference Δm_sum, the payload L(spez_L) can be completely tipped out of the picking unit 18 during the current tipping procedure (step 206). After that, further method steps (in particular steps 308 and 306 according to FIG. 5) can be taken to change the tilt angle w_k towards the starting angle w_k_st and to terminate the tipping procedure.

If the starting mass m_st is greater than the difference Δm_sum, the payload L(spez_L) should only be tipped out proportionately, namely as precisely as possible as the quantity of the mass corresponding to this difference Δm_sum. Thus, the payload mass m_zul that can be tipped out during this tilting procedure is predetermined to be the difference Δm_sum (step 208). This tipping procedure is the last tipping procedure of a loading activity in which, in contrast to the previous tipping procedures with full tipping out, only a pro rata tipping of the payload L(spez_L) out of the picking unit 18 is to be carried out in order to reach the target total mass m_sum_ziel at the loading station 26 as accurately as possible.

Also in step 208, the residual mass m_re that is to remain in the picking unit 18 is predetermined by the equation $$m\_re = m\_st - m\_zul.$$

Immediately before the tipping out, the determined current mass m_akt in the picking unit 18 corresponds to the starting mass m_st (steps 202, 208).

Until a predetermination of the payload mass m_zul to be tipped out or a predetermination of the residual mass m_re to be left in the picking unit 18, the procedure in the embodiment according to FIG. 4 is basically the same as the variant according to FIG. 3. In the method according to FIG. 4, however, a predetermined target value w_soll of the tilt angle w_k is not approached. Rather, the tilt angle w_k of the picking unit 18 is initially adjusted to the defined starting angle w_k_st (step 300). Based on this, the current tilt angle w_k will be gradually increased depending on the steps taken and already explained 302, 304, 312, 314, 316. The current tilt angle w_k of the picking unit 18 is changed in the tilting direction 34 (step 316), so that a further proportion of the payload L(spez_L) can be tipped out from the picking unit 18. With the selected straight reference line (vertical 32) and the xy coordinate system used according to FIG. 2, this means that the current tilt angle w_k is increased by a defined angle Δw and then equals w_k1 or w_k2 for example, For differently selected reference systems, the method step may at this point require a reduction in the current tilt angle w_k by a defined angle Δw.

Due to steps 304, 312, 314, 316, the current mass m_akt in the picking unit 18 that is continuously determined during the tilting (e.g., after each expiry of a time interval Δ1, Δ2) becomes increasingly smaller until in step 304 it is found that the current mass m_akt is less than or equal to the predetermined residual mass m_re including the tolerance mass m_tol. Then the tilting procedure is to be terminated. For this purpose, in step 308 the picking unit 18 is tilted opposite to the tilting direction 34. If an increase of the current tilt angle w_k had taken place in step 316, this means that in step 308 the last current tilt angle w_k is reduced by a defined angle Δw. The angles in steps 316 and 308 may be identical or different.

Regardless of whether the tipping procedure according to FIG. 3, FIG. 4 or any other embodiment occurs, trouble-free tipping out of the payload L (spez_L) from the picking unit 18 can be supported by performing at least one shaking procedure during the tipping out, during which the picking unit 18 is tilted at least once opposite to the tilting direction 34 and is then tilted in the tilting direction 34 again.

Regardless of the input unit 24 and display unit 28 separately represented in FIG. 1, in a further embodiment these two units may be grouped together in a single device. The schematic, block type representation of the input unit 24, the control unit 22 and the display unit 28 does not preclude such a unit from being able to consist of multiple component parts that are physically separated from each other.

It should be noted that individual details of the features presented in the drawings are at least partly not to scale.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for unloading a payload at a loading station, comprising:
 producing and storing calibration data via the control unit immediately before unloading the payload at the loading station;
 determining via a weighing device connected to a sensor system and a control unit a starting mass of the payload in a picking unit;
 registering via the control unit a total target quantity representing a total payload to be unloaded at the loading station;
 registering via the control unit a current total quantity representing the payload already unloaded at the loading station;
 comparing via the control unit the starting mass with a first difference between the total target quantity and the current total quantity;
 determining via the control unit to partially tip out the payload if the starting mass is greater than the first difference;
 determining via the control unit a residual mass of the payload to remain in the picking unit based on a second difference between the starting mass and the first difference;
 determining via the control unit a target value of a tilt angle of the picking unit corresponding to the residual mass based on the stored calibration data including specific type, particle geometries, temperature, and humidity of the payload and a holding time for the tilt angle;
 tipping via the control unit the picking unit to the target value of the tilt angle for the holding time so that the residual mass remains in the picking unit;
 determining via the weighing device a current mass of the payload in the picking unit;
 shaking via the control unit the picking unit for a defined shaking time when the current mass is greater than a sum of the residual mass and a tolerance mass;
 modifying via the control unit one or more of the defined shaking time and the tilt angle based on a third difference between the shaking mass and a defined mass limit value when the shaking mass is less than the defined mass limit value; and
 determining via the control unit whether the current mass is less than or equal to the sum of the residual mass and the tolerance mass when the tilt angle is less than a defined maximum tilt angle, which is less than a mechanical end stop of the picking unit.

2. A method for unloading a payload at a loading station, comprising:
 determining via a weighing device connected to a sensor system and a control unit a starting mass of the payload in a picking unit;
 registering via the control unit a total target quantity representing a total payload to be unloaded at the loading station;
 registering via the control unit a current total quantity representing the payload already unloaded at the loading station;
 comparing via the control unit the starting mass with a first difference between the total target quantity and the current total quantity;
 determining via the control unit to partially tip out the payload if the starting mass is greater than the first difference;
 determining via the control unit a residual mass of the payload to remain in the picking unit based on a second difference between the starting mass and the first difference;
 adjusting via the control unit a tilt angle of the picking unit to a defined starting angle;
 determining via the weighing device a current mass of the payload in the picking unit when the tilt angle is less than a defined maximum tilt angle, which is less than a mechanical end stop of the picking unit;
 shaking via the control unit the picking unit for a defined shaking time when the current mass is greater than a sum of the residual mass and a tolerance mass;
 modifying via the control unit one or more of the defined shaking time and the tilt angle based on a third difference between the shaking mass and a defined mass limit value when the shaking mass is less than the defined mass limit value; and
 determining via the control unit whether the current mass is less than or equal to the sum of the residual mass and the tolerance mass when the tilt angle is less than the defined maximum tilt angle.

3. The method of claim 1, wherein the control unit modifies the defined shaking time and increases the tilt angle based on the third difference between the shaking mass and the defined mass limit value when the shaking mass is less than the defined mass limit value.

4. The method of claim 1, further comprising:
 reducing the tilt angle to a defined starting angle when tilt angle is greater than or equal to the defined maximum tilt angle.

5. The method of claim 1, further comprising:
 reducing the tilt angle to a defined starting angle when the current mass is less than or equal to the sum of the residual mass and the tolerance mass.

6. The method of claim 2, wherein the control unit modifies the defined shaking time and increases the tilt angle based on the third difference between the shaking mass and the defined mass limit value when the shaking mass is less than the defined mass limit value.

7. The method of claim 2, further comprising:
 reducing the tilt angle to the defined starting angle when tilt angle is greater than or equal to the defined maximum tilt angle.

8. The method of claim 2, further comprising:
 reducing the tilt angle to the defined starting angle when the current mass is less than or equal to the sum of the residual mass and the tolerance mass.

* * * * *